US008672809B2

United States Patent
Saito et al.

(10) Patent No.: US 8,672,809 B2
(45) Date of Patent: Mar. 18, 2014

(54) ENGINE CONTROL APPARATUS

(75) Inventors: Tatsuya Saito, Chiryu (JP); Nobuhiko Shima, Kariya (JP); Tetsuo Morita, Nagoya (JP)

(73) Assignee: Denso Corporation, Kariya (JP)

( * ) Notice: Subject to any disclaimer, the term of this patent is extended or adjusted under 35 U.S.C. 154(b) by 112 days.

(21) Appl. No.: 13/242,423

(22) Filed: Sep. 23, 2011

(65) Prior Publication Data

US 2012/0077640 A1 Mar. 29, 2012

(30) Foreign Application Priority Data

Sep. 27, 2010 (JP) .................................. 2010-215044

(51) Int. Cl.
*B60W 10/04* (2006.01)
*B60W 10/18* (2012.01)

(52) U.S. Cl.
USPC ................ 477/186; 477/4; 477/101; 477/203

(58) Field of Classification Search
None
See application file for complete search history.

(56) References Cited

U.S. PATENT DOCUMENTS

| 6,190,284 | B1 | 2/2001 | Kuroda et al. | |
| 6,702,718 | B2 * | 3/2004 | Tani et al. | 477/203 |
| 8,323,152 | B2 * | 12/2012 | Albrecht | 477/184 |
| 8,326,520 | B2 * | 12/2012 | Bollig et al. | 701/113 |
| 2008/0201064 | A1 * | 8/2008 | DiGonis | 701/110 |

FOREIGN PATENT DOCUMENTS

| DE | 10 2008060350 | * | 6/2010 |
| JP | A-7-42580 | | 2/1995 |
| JP | A-11-257122 | | 9/1999 |
| JP | A-2000-2129 | | 1/2000 |
| JP | A-2004-183519 | | 7/2004 |
| JP | A-2005-105894 | | 4/2005 |
| JP | A-2008-25590 | | 2/2008 |
| JP | A-2008-215293 | | 9/2008 |
| JP | A-2009-41457 | | 2/2009 |

OTHER PUBLICATIONS

Notification of Reasons for Rejection dated Aug. 6, 2013 from Japanese Patent Application No. 2010-215044 (with English-language translation).

* cited by examiner

*Primary Examiner* — David D Le
*Assistant Examiner* — Mark Manley
(74) *Attorney, Agent, or Firm* — Oliff PLC

(57) ABSTRACT

An engine control apparatus capable of performing engine automatic stop includes an engine automatic stop inhibition means configured to inhibit the engine automatic stop after engine restart conditions are satisfied and the engine is restarted until a vehicle speed exceeds a predetermined speed, a brake operation detection means configured to detect a presence of increase of the amount of a brake operation in a state of the brake operation being performed after the vehicle has been stopped, and an engine stop control means configured to release inhibition of the engine automatic stop to allow the engine to be automatically stopped, if the brake operation detection means detects presence of increase of the amount of the brake operation while the engine automatic stop is inhibited by the engine automatic stop inhibition means.

5 Claims, 4 Drawing Sheets

US 8,672,809 B2

ENGINE CONTROL APPARATUS

This application claims priority to Japanese Patent Application No. 2010-215044 filed on Sep. 27, 2010, the entire contents of which are hereby incorporated by reference.

BACKGROUND OF THE INVENTION

1. Field of the Invention

The present invention relates to an engine control apparatus.

2. Description of Related Art

There is known the so-called idle stop control in which a vehicle engine in an idle state is automatically stopped when predetermined stop conditions are satisfied, and the engine is automatically restarted when predetermined start conditions are satisfied thereafter, as described in Japanese Patent Applicant Laid-open No. 2008-25590, for example. This patent document describes that when an engine of a vehicle is automatically restarted after being automatically stopped by the idle stop control, the engine is inhibited from being automatically stopped until the vehicle speed exceeds a predetermined speed. This makes it possible to prevent frequent starts and stops of the engine when the vehicle is caught in a traffic jam.

However, there may occur a case where the vehicle driver wishes to stop the engine before the vehicle reaches the predetermined speed. In such a case, since the idle stop control does not work until the vehicle reaches exceeds predetermined speed, it is not possible to receive the full benefit of the idle stop control, such as reduction of fuel consumption.

SUMMARY

An exemplary embodiment provides an engine control apparatus for applying a brake force to a vehicle in accordance with an amount of a brake operation by a vehicle driver, performing engine automatic stop to automatically stop an engine of the vehicle when predetermined engine stop conditions are satisfied, and restarting the engine when predetermined engine restart conditions are satisfied, comprising:

an engine automatic stop inhibition means configured to inhibit the engine automatic stop after the engine restart conditions are satisfied and the engine is restarted until a vehicle speed exceeds a predetermined speed;

a brake operation detection means configured to detect a presence of increase of the amount of the brake operation in a state of the brake operation being performed after the vehicle has been stopped; and an engine stop control means configured to release inhibition of the engine automatic stop to allow the engine to be automatically stopped, if the brake operation detection means detects presence of increase of the amount of the brake operation while the engine automatic stop is inhibited by the engine automatic stop inhibition means.

According to the present exemplary embodiment, there is provided an engine control apparatus capable of performing engine automatic stop by idle stop control taking into account the vehicle drivers' will.

Other advantages and features of the invention will become apparent from the following description including the drawings and claims.

PREFERRED EMBODIMENTS OF THE INVENTION

Figure 1:
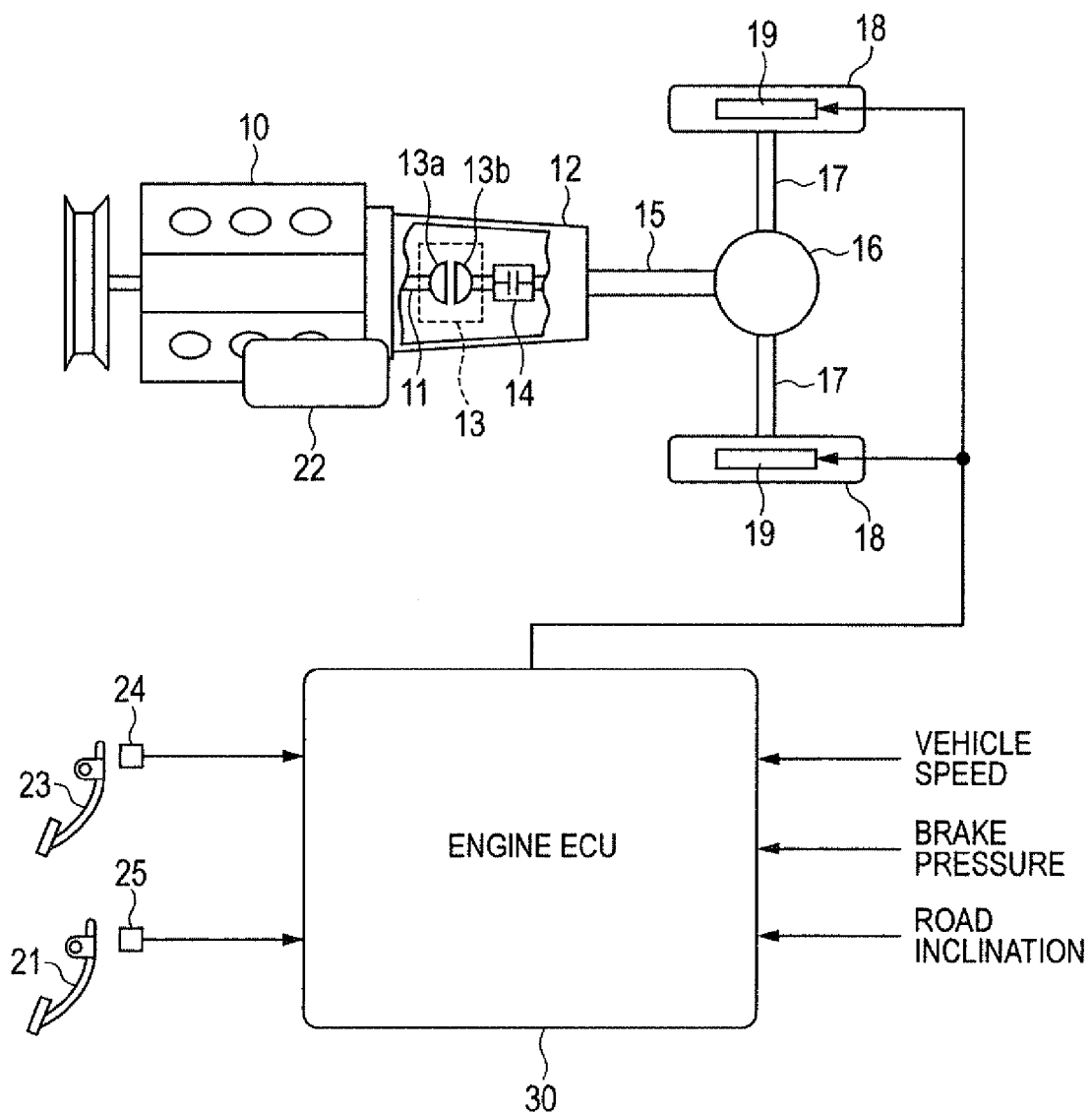
FIG. 1 is a diagram showing the schematic structure of a vehicle control system including an engine control apparatus according to an embodiment of the invention.

FIG. 1 is a diagram showing the schematic structure of a vehicle control system including an engine control apparatus according to an embodiment of the invention, this system being mounted on a vehicle having an engine 10 and an automatic transmission 12.

The engine 10 is a multiple-cylinder engine having injectors and igniters (not shown). The engine 10 has an output shaft (crankshaft) 11 coupled to the automatic transmission 12. The automatic transmission 12 includes a torque converter 13 and an automatic transmission mechanism 14, and is configured to convert the torque of the crankshaft 11 in accordance with a set transmission gear ratio and transmit it to a transmission output shaft 15. More specifically, the torque converter 13 is a fluid clutch constituted of a pump impeller 13a connected to the crankshaft 11, and a turbine runner 13b connected to the input shaft of the automatic transmission mechanism 14. The torque converter 13 transmits power received from the engine 10 to the automatic transmission mechanism 14.

The transmission output shaft 15 is coupled to drive wheels 18 of the vehicle through a differential gear 16 and an axle 17. Each of the drive wheels 18 is provided with a brake actuator 19 configured to apply a brake force to the drive wheel 18 when driven by a hydraulic circuit (not shown). The brake actuator 19 is configured to adjust a brake force applied to the drive wheel 18 in accordance with the pressure of a master cylinder (not shown) that transmits a depression force of a brake pedal 21 to the hydraulic oil.

The vehicle control system 1 also includes a starter 22 for applying an initial rotation (cranking rotation) to the engine 10 to start the engine 10.

An ECU 30, which is mainly constituted of a microcomputer including a CPU, a ROM and a RAM, performs various controls to run the vehicle by executing various control programs stored in the ROM. More specifically, the ECU 30 performs various engine controls including fuel injection control by way of the injectors and ignition control by way of the ignition device, drive control of the starter 22, brake control by way of the brake actuators 19, and transmission gear ratio control by way of the automatic transmission 12. The ECU 30 is connected with various sensors including an accelerator sensor 24 for detecting a depression amount of an accelerator pedal 23, a brake sensor 25 for detecting a depression amount of the brake pedal 21, a vehicle speed sensor (not shown), a brake pressure sensor for detecting the pressure inside the master cylinder, and a G-sensor (not shown) for detecting acceleration of the vehicle. Detection signals outputted from these sensors are inputted to the ECU 30. The vehicle control system 1 also includes a rotational speed sensor for detecting the rotational speed of the engine 10, and load sensors such as an air flow meter and a suction pressure sensor.

Next, idle stop control performed by the vehicle control system 1 is explained. The idle stop control operates to automatically stop the engine 10 in idle state when predetermined engine stop conditions are satisfied, and automatically restarts the engine 10 when predetermined restart conditions are satisfied in order to reduce fuel consumption of the engine 10. The engine stop conditions include that the vehicle speed decreases below a predetermined threshold speed (several km/h to over ten km/h), and that the brake operation amount (the brake pressure in this embodiment) exceeds a predetermined threshold value. The engine stop conditions may further include at least one of that the shift position of the automatic transmission 12 is in a drive range (D range, for example), that an accelerator pedal operation amount is zero, and that the battery voltage of a vehicle battery is above a predetermined voltage. The engine restart conditions include at least one of that the accelerator pedal is operated when the engine 10 is in the stopped state, and that a brake operation is released.

In this embodiment, the idle stop control does not automatically stop the engine 10 having been automatically restarted until the vehicle speed exceeds a predetermined speed even if the engine stop condition is satisfied.

Figure 2:
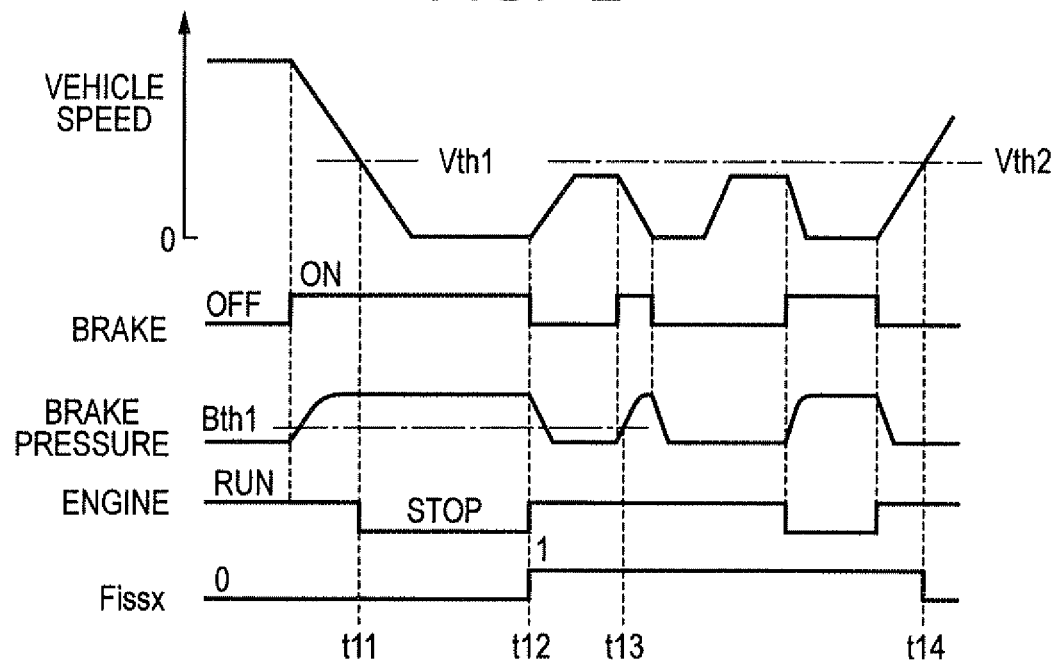
FIG. 2 is a time chart showing an example of inhibition of engine automatic stop in the vehicle control system.

FIG. 2 is a time chart showing an example of inhibition of the engine automatic stop. In this example, the brake pedal 21 is depressed when the vehicle is running, and as a result the brake pressure exceeds a first threshold value Bth1, and the vehicle speed decreases below a first threshold speed Vth1 at timing t11. The engine 10 is automatically stopped at this timing t11. When the engine restart conditions are satisfied at timing t12 by release of a brake operation, for example, the engine 10 is automatically restarted at this timing t12.

When the vehicle is caught in a traffic jam, the vehicle driver is likely to depress and release the brake pedal 12 repeatedly to cause the vehicle to creep. In this case, if the engine 10 is stopped and restarted every time the brake pedal 21 is operated, it is not possible to run the vehicle by efficiently using a creep force. Accordingly, in this embodiment, an engine stop inhibition flag Fissx is set to 1 at the timing t12 at which the engine restart conditions are satisfied, in order to inhibit the engine 10 from being automatically stopped in the speed range below a second threshold speed Vth2. Hence, the engine 10 continues to run without being automatically stopped even when the brake pressure exceeds the first threshold value Bth1 at timing t13 after the engine 10 is restarted, until the vehicle speed exceeds the second threshold speed Vth2. When the vehicle speed exceeds the second threshold speed Vth2 at timing t14, the engine stop inhibition flag Fissx is reset to 0 at this timing t14 to release inhibition of the engine automatic stop.

The first and second threshold speeds Vth1 and Vth2 may be the same with or different from each other. In this embodiment, the second threshold speed Vth2 is set to a value equal to or slightly higher than a higher limit value of a creep speed of the vehicle.

However, it may occur that the vehicle driver wishes to stop the engine even during a period in which the engine automatic stop is inhibited.

Accordingly, this embodiment has a structure to determine whether the vehicle driver is willing to cause the engine to be automatically stopped during a period in which the engine automatic stop is inhibited, based on a depression amount of the brake pedal 21 when the vehicle is in the stopped state. More specifically, if the brake pedal 21 is depressed further deeply by the vehicle driver in a state of the brake pedal being depressed during a period in which the engine automatic stop is inhibited after the vehicle has been automatically stopped, inhibition of the engine automatic stop is released assuming that the vehicle driver is willing to cause the engine to be automatically stopped.

Figure 3:
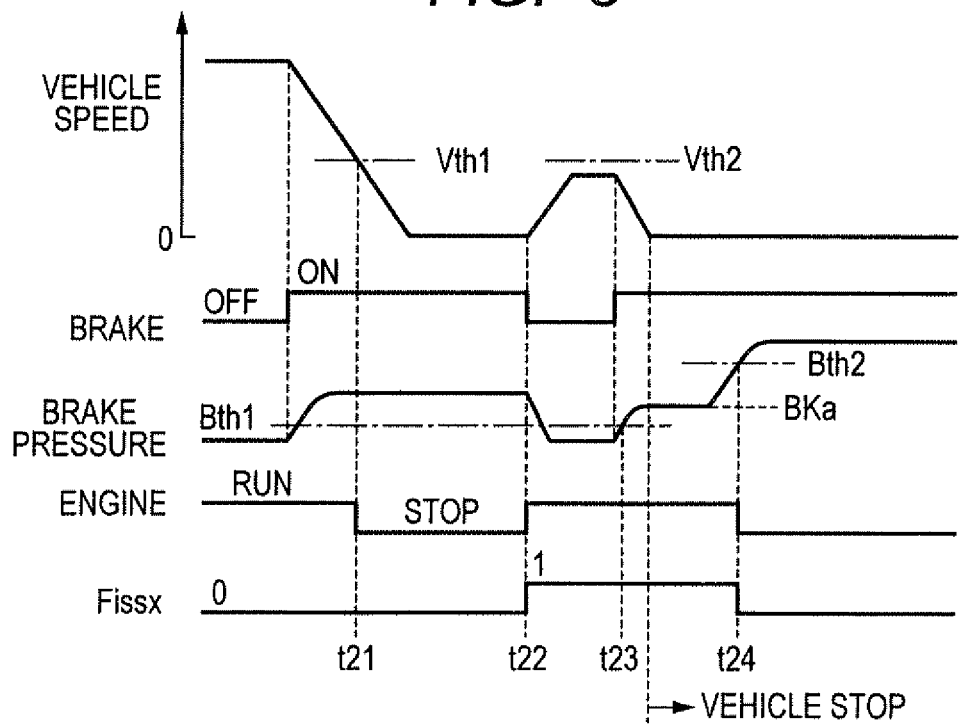
FIG. 3 is a time chart showing an example of engine automatic stop in the vehicle control system.

FIG. 3 is a time chart showing an example of the engine automatic stop in this embodiment. In FIG. 3, the engine stop conditions are satisfied and the engine 10 is automatically stopped at timing t21. Thereafter, the engine 10 is automatically restarted when the engine restart conditions are satisfied at timing 22. At the timing t22, also the engine stop inhibition flag Fissx is set to 1.

After the engine is restarted, the engine stop inhibition flag Fissx is kept at 1 as long as the vehicle speed is below the second threshold speed Vth2. In this case, the engine 10 continues to run even if the brake pressure BKa exceeds the first threshold value Bth1 by the vehicle driver's operation of the brake pedal 21, because the engine automatic start is inhibited. Thereafter, the brake pedal 21 is kept depressed and the vehicle is brought to the stopped state. In this state, if the brake pedal 21 is depressed further deeply by the vehicle driver, and as a result the brake pressure is further increased, the engine stop inhibition flag Fissx is reset to 0 to release inhibition of the engine automatic start to thereby stop the engine 10. As explained above, in this embodiment, when the brake pedal 21 is depressed further deeply after the vehicle has been stopped such that the value of the brake pressure BKa increases from that when the vehicle was stopped, the engine is automatically stopped assuming that the vehicle driver is willing to cause the engine to be automatically stopped. Further, in this embodiment, to determine whether the vehicle driver is willing to cause the engine to be automatically stopped, the second threshold value Bth2 is used. That is, if the brake pressure exceeds the second threshold value Bth2 at timing t24 while the vehicle is stopped, the engine stop inhibition flag Fissx is reset to 0 to allow the engine 10 to be automatically stopped. The second threshold value Bth2 is set higher than the first threshold value Bth1.

Figure 4:
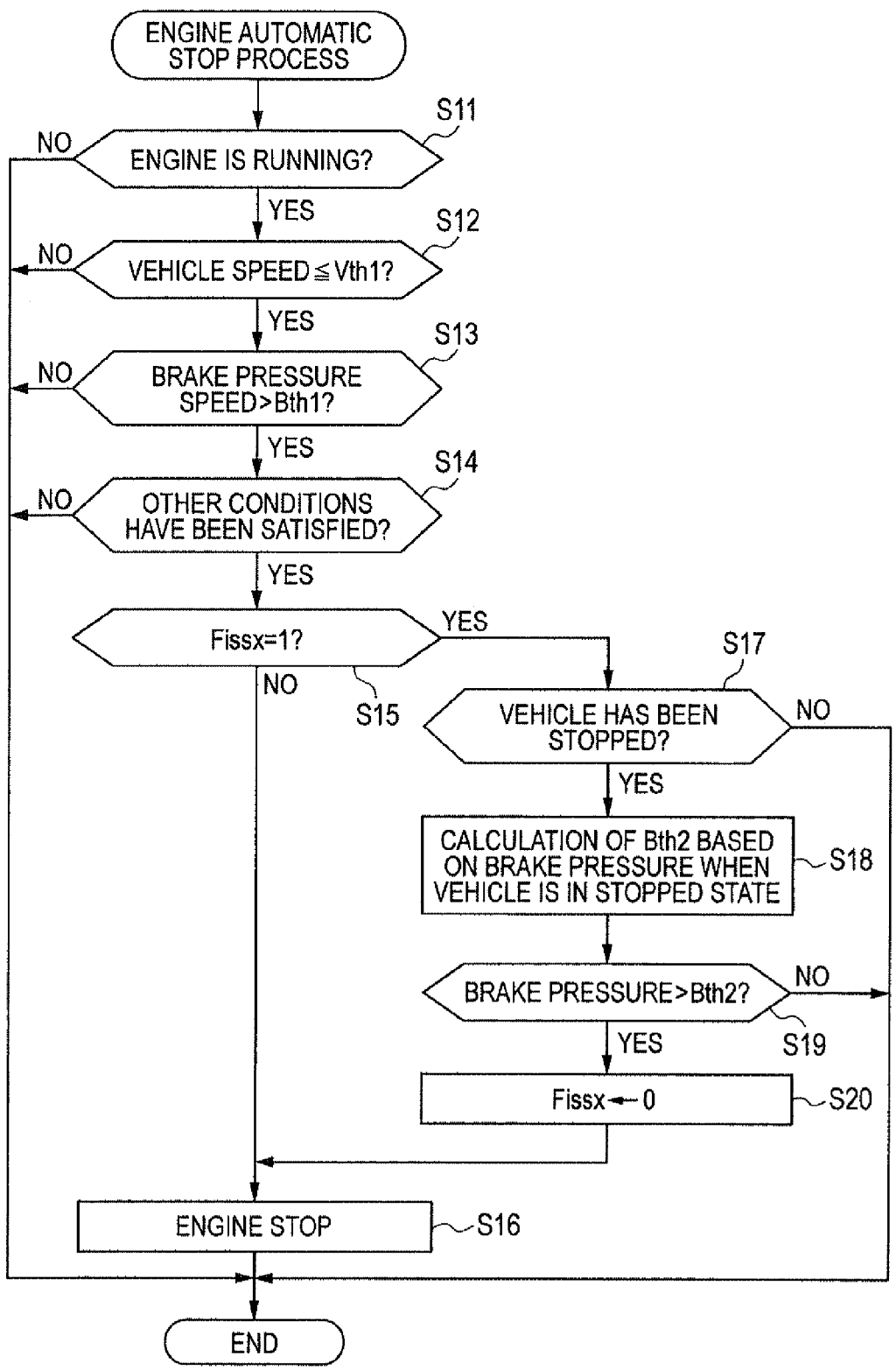
FIG. 4 is a flowchart showing the process of engine automatic stop performed in the vehicle control system.
Figure 5:
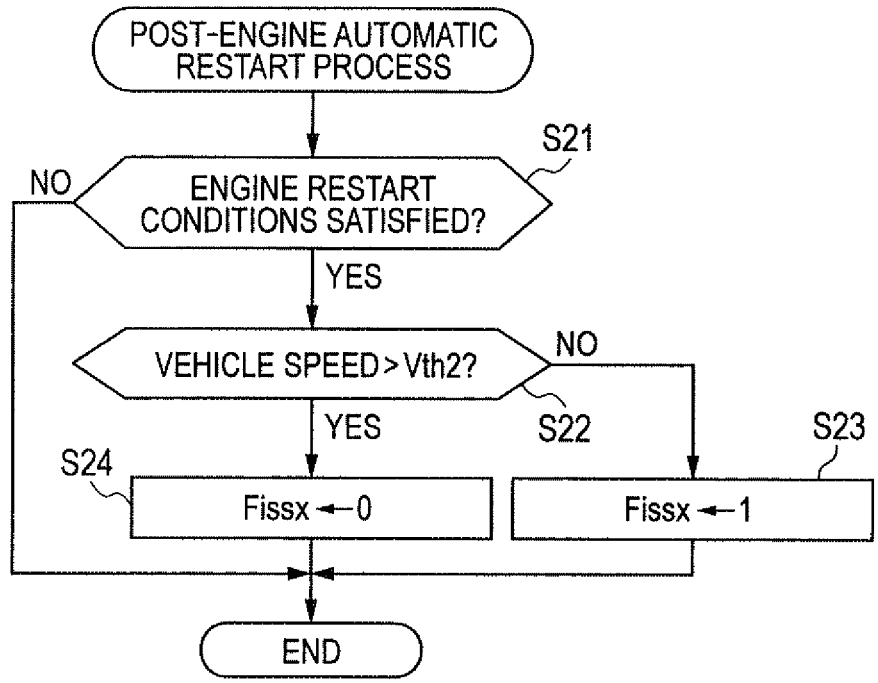
FIG. 5 is a flowchart showing the post-engine restart process performed in the vehicle control system.

Next, an example of the engine automatic stop by the idle stop control in this embodiment is explained with reference FIGS. 4 and 5. FIG. 4 is a flowchart showing the process of the engine automatic stop by the idle stop control. FIG. 5 is a flowchart showing the post-engine restart process performed by the idle stop control. These processes are performed at regular time intervals by the microcomputer of the ECU 30.

As shown in FIG. 4, the process of engine automatic stop begins by determining whether or not the engine 10 is running or not. If the determination result in step S11 is affirmative, the process proceeds to step S12 to determine whether or not the vehicle speed detected by the wheel speed sensor is lower than or equal to the first threshold speed Vth1. If the determination result in step S12 is negative, the process is terminated, and otherwise proceeds to step S13 to determine whether or not the brake pressure detected by the brake pressure sensor is higher than the first threshold value Bth1. If the determination result in step S13 is negative, the process is terminated, and otherwise proceeds to step S14 to determine whether the other engine stop conditions (that the shift position is in the D-range, for example) are satisfied.

If the determination result in step S14 is affirmative, the process proceeds to step S15 to determine whether or not the engine stop inhibition flag Fissx has been set to 1. If the determination result in step S14 is negative, the process proceeds to step S16 to halt fuel injection and ignition to stop the engine 10, and then this process is terminated.

If the determination result in step S14 is affirmative, the process proceeds to step S17 to determine whether or not the vehicle is in the stopped state. In this embodiment, if the vehicle speed detected by the wheel speed sensor is 0, it is determined that the vehicle is in the stopped state. If the determination result in step S17 is affirmative, the process proceeds to step S18 to set the second threshold value Bth2 based on the brake pressure (BKa shown in FIG. 3) observed when the vehicle is in the stopped state. In this embodiment, the brake pressure observed when the vehicle is in the stopped state is stored, and the second threshold value Bth2 is set to the value of the stored brake pressure plus a predetermined value $\alpha$. Alternately, the second threshold value Bth2 may be set to the value of the stored brake pressure multiplied by a correction coefficient larger than 1. The brake pressure in the vehicle's stopped state may be the brake pressure at the moment when the vehicle speed becomes 0, or an average of the brake pressure during a predetermined time including the moment when the vehicle speed becomes 0.

In subsequent step S19, it is determined whether or not the brake pressure detected by the brake pressure sensor is higher than the second threshold value Bth2. If the determination result in step S19 is negative, the process is terminated. In this case, engine automatic stop continues to be inhibited. If the determination result in step S19 is affirmative, the process proceeds to step S20 to reset the engine stop inhibition flag Fissx to 0, as a result of which the engine 10 is automatically stopped. Thereafter, this process is terminated.

Next, the engine post-engine automatic restart process is explained with reference to the flowchart of FIG. 5. This process begins by determining whether it is the time to start the engine 10 after the engine restart conditions have been satisfied. If the determination result in step S21 is affirmative, the process proceeds to step S 22 to determine whether or not the vehicle speed detected by the wheel speed sensor is higher than the second threshold speed Vth2. If the determination result in step S22 is negative, the process proceeds to step S23 to set the engine stop inhibition flag Fissx to 1, and otherwise proceeds to step S24 to reset the engine stop inhibition flag Fissx to 0. As a result, the engine 10 is inhibited from being automatically stopped until the vehicle speed exceeds the second threshold speed Vth2 after restart of the engine 10.

The above described embodiment provides the following advantages.

The above embodiment is configured to determine whether the vehicle driver is willing to cause the engine to be automatically stopped based on presence or absence of the vehicle driver's operation to further deeply depress the brake pedal when the vehicle is in the stopped state. Accordingly, the vehicle driver can show the vehicle that the vehicle driver is willing that the engine 10 should be automatically stopped easily only by increasing a depression amount of the brake pedal when the vehicle is in the stopped state.

The above embodiment is configured to release inhibition of engine automatic stop depending on the vehicle driver's operation after the vehicle is stopped. This makes it possible to control the vehicle engine in accordance with the vehicle diver's will, while enabling the vehicle to run using creep force.

The above embodiment is configured to allow the engine to be automatically stopped while the vehicle decelerates if the brake pressures exceeds the first threshold value Bth1, and to allow the engine to be automatically stopped if the brake pedal is depressed further deeply while the vehicle is stopped causing the brake pressure to exceed the second threshold value Bth2 higher than the first threshold value Bth1. This makes it possible to determine whether the vehicle driver is willing that engine automatic stop should function even when the vehicle is stopped with the brake pedal being depressed.

The second threshold value Bth2 is set based on a depression amount of the brake pedal being operated to stop the vehicle. This makes it possible to reliably determine whether the vehicle driver is willing to cause the engine to be automatically stopped irrespective of individual variation in operation of the brake pedal.

Other Embodiments

It is a matter of course that various modifications can be made to the above described embodiment as described below.

In the above embodiment, to determine whether the vehicle driver is willing to cause the engine to be automatically stopped, the brake pressure is compared with the second threshold value Bth2 to detect presence of increase of a depression amount of the brake pedal. However, presence of increase of a depression amount of the brake pedal may be detected based on variation per unit time of the depression amount. In this case, a derivative of variation of the brake pressure detected by the brake pressure sensor or the depression amount detected by the brake sensor is calculated to detect presence of increase of a depression amount of the brake pedal.

In the above embodiment, to detect an operation amount of the brake pedal, the first and second threshold values Bth1 and Bth2 are used. However, engine automatic stop may be performed using only the second threshold value Bth2. In this case, the engine stop conditions include that the brake pedal has been depressed, so that the engine is automatically stopped on condition that the brake pedal has been depressed during deceleration of the vehicle.

In the above embodiment, the second threshold value Bth2 is variably set depending on the brake pressure when the vehicle is in the stopped condition. However, the threshold pressure Bth2 may be set to a fixed value.

Figure 6:
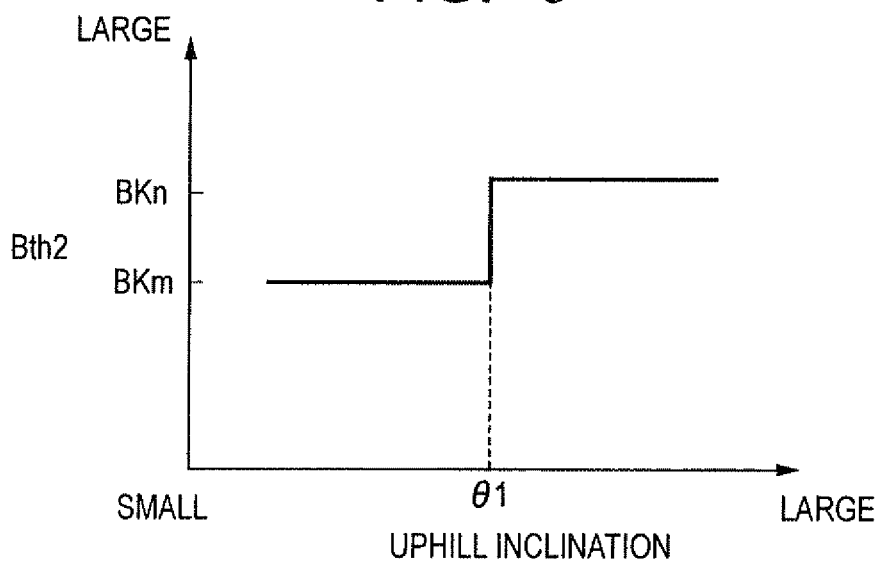
FIG. 6 is a diagram showing a relationship between a road inclination and a second threshold used in the vehicle control system.

The above embodiment may be modified to include means to detect an inclination of the road so that the second threshold value Bth can be set taking into account the inclination of the road. For example, when the vehicle is stopped on an uphill road, it is possible for the vehicle driver to prevent the vehicle from slipping down using the brake force and creep force. However, if the engine is stopped after the vehicle is stopped on the uphill road, the vehicle may slip down unexpectedly, because the creep force does not act. This modification can deal with this matter. In this modification, for example, the second threshold value Bth2 is set to a value of BKm when the inclination of the road is smaller than $\theta 1$, and set to a value of BKn larger than BKm when the inclination of the road is larger than or equal to $\theta 1$ as shown in FIG. 6. The second threshold value Bth2 may be increased in proportion with the increase of the road inclination. The means to detect a road inclination may be one that calculates the road inclination based on the output of the G-sensor, or one that calculates the road inclination based on the output of an inclination sensor.

The above embodiment may be modified such that engine automatic stop inhibition is released when the vehicle driver operates the brake pedal causing the brake pressure to exceed the second threshold value Bth continuously for more than a predetermined time after the engine 10 is restarted, in order to automatically stop the engine 10. This enables to stop the engine 10 after confirming the vehicle driver's will more reliably.

In the above embodiment, the means to detect a brake operation amount to confirm the vehicle driver's will is constituted of the brake pressure sensor and the ECU 30. However, this means may be constituted of the brake sensor 25 to detect a depression amount of the brake pedal 21 and the ECU 30. Further, this means may be constituted of a hydraulic pressure sensor for detecting the hydraulic pressure of a hydraulic circuit of the brake actuator 19, and the ECU 30.

In the above embodiment, the vehicle is equipped with the automatic transmission 12. However, the invention is applicable to a vehicle equipped with a manual transmission.

In the above embodiment, the vehicle has the gasoline engine 10. However, the invention is applicable to a vehicle having a diesel engine.

The above explained preferred embodiments are exemplary of the invention of the present application which is described solely by the claims appended below. It should be understood that modifications of the preferred embodiments may be made as would occur to one of skill in the art.

What is claimed is:

1. An engine control apparatus for applying a brake force to a vehicle in accordance with an amount of a brake operation by a vehicle driver, performing engine automatic stop to automatically stop an engine of the vehicle when predetermined engine stop conditions are satisfied, and restarting the engine when predetermined engine restart conditions are satisfied, comprising:

an engine automatic stop inhibition unit that inhibits the engine automatic stop, only after the engine restart conditions are satisfied and the engine is restarted, until a vehicle speed exceeds a predetermined speed;

a brake operation detection unit that detects a presence of increase of the amount of the brake operation in a state of the brake operation being performed after the vehicle has been stopped; and an engine stop control unit that releases inhibition of the engine automatic stop to allow the engine to be automatically stopped, if the brake operation detection unit detects presence of increase of the amount of the brake operation while the engine automatic stop is inhibited by the engine automatic stop inhibition unit.

2. The engine control apparatus according to claim 1, wherein the engine stop conditions include that an amount of the brake operation exceeds a first threshold value during deceleration of the vehicle, and the brake operation detection unit is configured to determine that increase of the amount of the brake operation is present if the amount of the brake operation exceeds a second threshold value set larger than the first threshold value while the brake operation is performed.

3. The engine control apparatus according to claim 2, wherein the second threshold value is set depending on the amount of the brake operation observed when the vehicle is stopped.

4. The engine control apparatus according to claim 2, wherein the vehicle has an automatic transmission with a torque converter that transmits power generated by the engine to an axle of the vehicle, and an inclination detection sensor for detecting inclination of a road on which the vehicle is running, the second threshold value being set depending on inclination detected by the inclination detection sensor.

5. The engine control apparatus according to claim 1, wherein the brake operation detection unit detects when a brake pressure exceeds a brake pressure from when the vehicle is stopped.

* * * * *